(12) United States Patent
Ko

(10) Patent No.: US 8,824,133 B2
(45) Date of Patent: Sep. 2, 2014

(54) FASTENING MECHANISM FOR ELECTRONIC DEVICE AND AN ELECTRONIC DEVICE USING THE SAME

(75) Inventor: Ping-Yu Ko, New Taipei (TW)

(73) Assignee: Wistron Corporation, New Taipei (TW)

( * ) Notice: Subject to any disclaimer, the term of this patent is extended or adjusted under 35 U.S.C. 154(b) by 267 days.

(21) Appl. No.: 13/557,302

(22) Filed: Jul. 25, 2012

(65) Prior Publication Data

US 2013/0027855 A1 Jan. 31, 2013

(30) Foreign Application Priority Data

Jul. 29, 2011 (TW) .............................. 100127019 A

(51) Int. Cl.
*G06F 1/16* (2006.01)
*G06F 1/18* (2006.01)

(52) U.S. Cl.
CPC .............. *G06F 1/1658* (2013.01); *G06F 1/187* (2013.01)
USPC ...................... 361/679.39; 435/40.5; 451/349; 439/595

(58) Field of Classification Search
USPC ........... 435/3, 7.2, 40.5, 7.1, 4; 451/9, 67, 52, 451/398, 458, 349, 121; 439/190, 290, 439/607.1, 108, 101, 595, 79, 487, 626, 439/607.2, 629, 639, 638, 607.55, 541.5, 439/532; 345/419.7, 156, 157, 163, 440, 345/1.3, 1.1, 685, 905, 158, 173; 312/223.1, 223.6, 194, 322, 223.2, 312/209; 361/679.01, 679.31, 679.47, 361/679.4, 679.03, 679.26, 679.29, 679.3, 361/679.02, 679.28, 679.45, 679.27, 361/679.58, 679.43, 679.33
See application file for complete search history.

(56) References Cited

U.S. PATENT DOCUMENTS

| | | | | |
|---|---|---|---|---|
| 5,952,997 | A * | 9/1999 | Hu .................................. | 345/163 |
| 8,475,194 | B2 * | 7/2013 | Bertini et al. .................. | 439/290 |
| 2014/0111912 | A1 * | 4/2014 | Gobeil ....................... | 361/679.01 |

FOREIGN PATENT DOCUMENTS

TW M279896 11/2005

OTHER PUBLICATIONS

Office Action issued to Taiwanese Counterpart Application No. 100127019 (Filed Jul. 29, 2011), Inventor: Ko Ping-Yu, Applicant: Wistron Corp; pp. 1-2.

* cited by examiner

*Primary Examiner* — Hung Duong
(74) *Attorney, Agent, or Firm* — SmithAmundsen LLC; Kelly J. Smith; Dennis S. Schell

(57) ABSTRACT

A fastening mechanism includes a nosepiece, a rotating unit, a torsion spring and a locking unit. The nosepiece is disposed at one side of an object removably disposed in a housing. The rotating unit includes a wheel body including a peripheral wall with an outer peripheral friction surface disposed in frictional contact with a side surface of the nosepiece and a rotating disc formed with a notch. The rotating unit is operable to rotate in a releasing direction relative to the housing as biased by the torsion spring to move the object away from the housing through an opening by virtue of the frictional contact. The locking unit releasably engages the rotating disc to dispose the rotating unit at a stopped position.

18 Claims, 8 Drawing Sheets

FASTENING MECHANISM FOR ELECTRONIC DEVICE AND AN ELECTRONIC DEVICE USING THE SAME

CROSS-REFERENCE TO RELATED APPLICATION

This application claims priority of Taiwanese Patent Application No. 100127019, filed on Jul. 29, 2011, the disclosure of which is incorporated herein by reference.

BACKGROUND OF THE INVENTION

1. Field of the Invention

The invention relates to a fastening mechanism for an electronic device, and more particularly to a fastening mechanism for use in an electronic device to fasten electronic elements.

2. Description of the Related Art

With the progress of computer technologies, the update of peripherals is becoming increasingly faster, and users often need to remove or install peripheral electronic elements (e.g., an optical disk drive) in order to upgrade or expand peripheral electronic elements of a computer. Therefore, a computer allowing easy removal and installation of peripheral electronic elements can better satisfy the users' needs.

Taking a peripheral electronic element for assembly to a computer through screw fasteners as an example, the disadvantage lies in that a tool needs to be used to remove the screw fasteners one by one, and after the peripheral electronic element is replaced, the screw fasteners need to be re-fastened in sequence. For such a design, the removal and installation process is both complicated and time consuming. In addition, the removed screw fasteners generally are held in hand or placed at random, and are easily lost.

SUMMARY OF THE INVENTION

Therefore, an object of the present invention is to provide an electronic device for which electronic elements can be installed conveniently without screw fasteners and removed with ease.

According to this invention, there is provided an electronic device comprising a housing, an object and a fastening mechanism. The housing is formed with an opening and a through hole. The object is removably disposed in the housing and covers the opening, and is operable to be removed from the housing through the opening. The fastening mechanism includes a nosepiece, a rotating unit, a torsion spring and a locking unit.

The nosepiece is disposed at one side of the object and is located in the housing. The nosepiece includes an outer end that faces the opening, and a side surface that extends from the outer end in a direction away from the opening. The rotating unit extends through the through hole and is rotatably coupled to the housing. The rotating unit includes a wheel body that is disposed in the housing, and a rotating disc that is coupled to the wheel body and disposed outside the housing. The wheel body includes a peripheral wall and a stop block that protrudes from the peripheral wall and that is operable to abut against the outer end of the nosepiece. The peripheral wall has an outer peripheral friction surface that is disposed in frictional contact with the side surface of the nosepiece. The rotating disc is formed with a first positioning notch. The rotating unit is operable to rotate in a releasing direction relative to the housing to bring the stop block to move away from the outer end and to move the object away from the housing through the opening by virtue of the frictional contact between the outer peripheral friction surface and the side surface of the nosepiece. The torsion spring is disposed in the housing and is operable to bias the rotating unit in the releasing direction. The locking unit is mounted to the housing and releasably engages the first positioning notch.

The rotating unit is disposed at a stopped position, where the stop block abuts against the outer end of the nosepiece and the object is positioned in the housing, when the locking unit is engaged with the first positioning notch.

In one embodiment, at least one of the nosepiece and the wheel body is made of a soft material.

In one embodiment, the outer peripheral friction surface is an involute contour, and the side surface is an oblique surface in tangential contact with the involute contour.

In one embodiment, the wheel body further includes an end wall connected to one end of the peripheral wall. The end wall is formed with a circular recess. The involute contour is an involute trace with the circular recess serving as a base circle thereof.

In one embodiment, the housing is further formed with a sliding groove in communication with the external environment. The locking unit includes a locking lever that extends through the sliding groove and is releasably engaged with the first positioning notch, and a spring that is disposed within the housing and biases the locking lever toward the rotating disc.

In one embodiment, the rotating disc is further formed with a second positioning notch spaced at an angle from the first positioning notch. The locking lever is releasably engaged with the second positioning notch. The rotating unit is disposed at a released position, where the stop block is distal from the outer end and the object is partially removed from the housing, when the locking lever is engaged with the second positioning notch.

In one embodiment, the rotating disc includes a disc body and a rotating shaft fixed to the disc body. The disc body is formed with the first positioning notch and the second positioning notch. The end wall of the wheel body is further formed with a noncircular engaging aperture in communication with the circular recess. The rotating shaft has a noncircular engaging block engaged with the engaging aperture for coupling the rotating disc to the wheel body.

In one embodiment, the rotating shaft is formed with an elongated aperture extending longitudinally. The torsion spring includes an inner end that is engaged with the elongated aperture and an outer end that is connected to the housing. The fastening mechanism further includes a screw fastener extending through the engaging aperture and screwed into the elongated aperture. The locking lever has a slot.

The effect of the present invention lies in that with the fastening mechanism thus configured, the object can not only be installed in or removed from the housing more conveniently and rapidly, but the installation and removal of the object in and from the housing can also be executed in a smooth manner due to a constant frictional force maintained between the side surface of the nosepiece and the involute contour of the rotating unit, which are maintained in tangential contact with each other.

BRIEF DESCRIPTION OF THE DRAWINGS

Other features and advantages of the present invention will become apparent in the following detailed description of the embodiment with reference to the accompanying drawings, of which.

DETAILED DESCRIPTION OF THE PREFERRED EMBODIMENT

The above-mentioned and other technical contents, features, and effects of this invention will be clearly presented from the following detailed description of one embodiment in coordination with the reference drawings.

Figure 1:
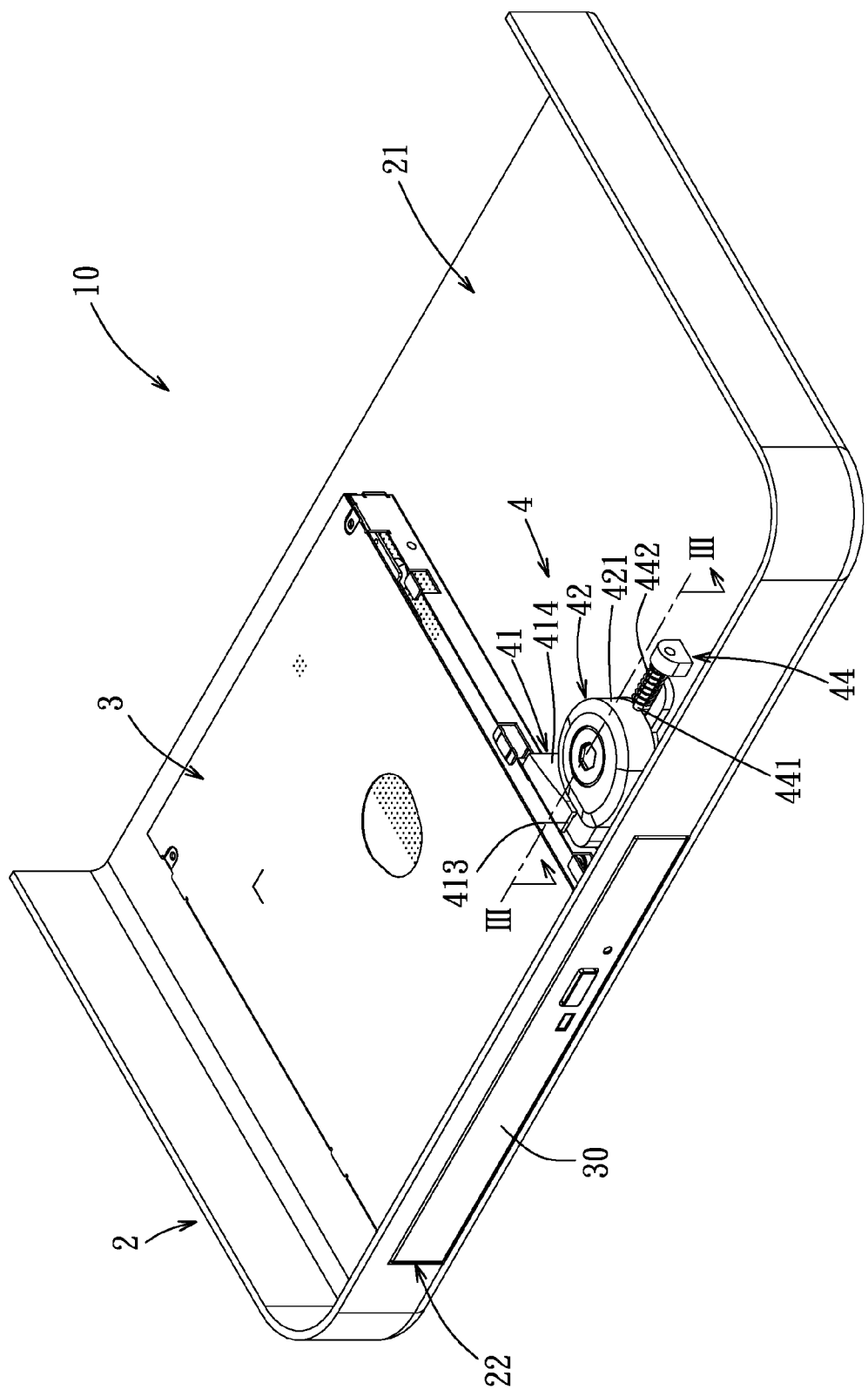
FIG. 1 is an assembled perspective view of an embodiment of an electronic device according to the present invention.
Figure 2:
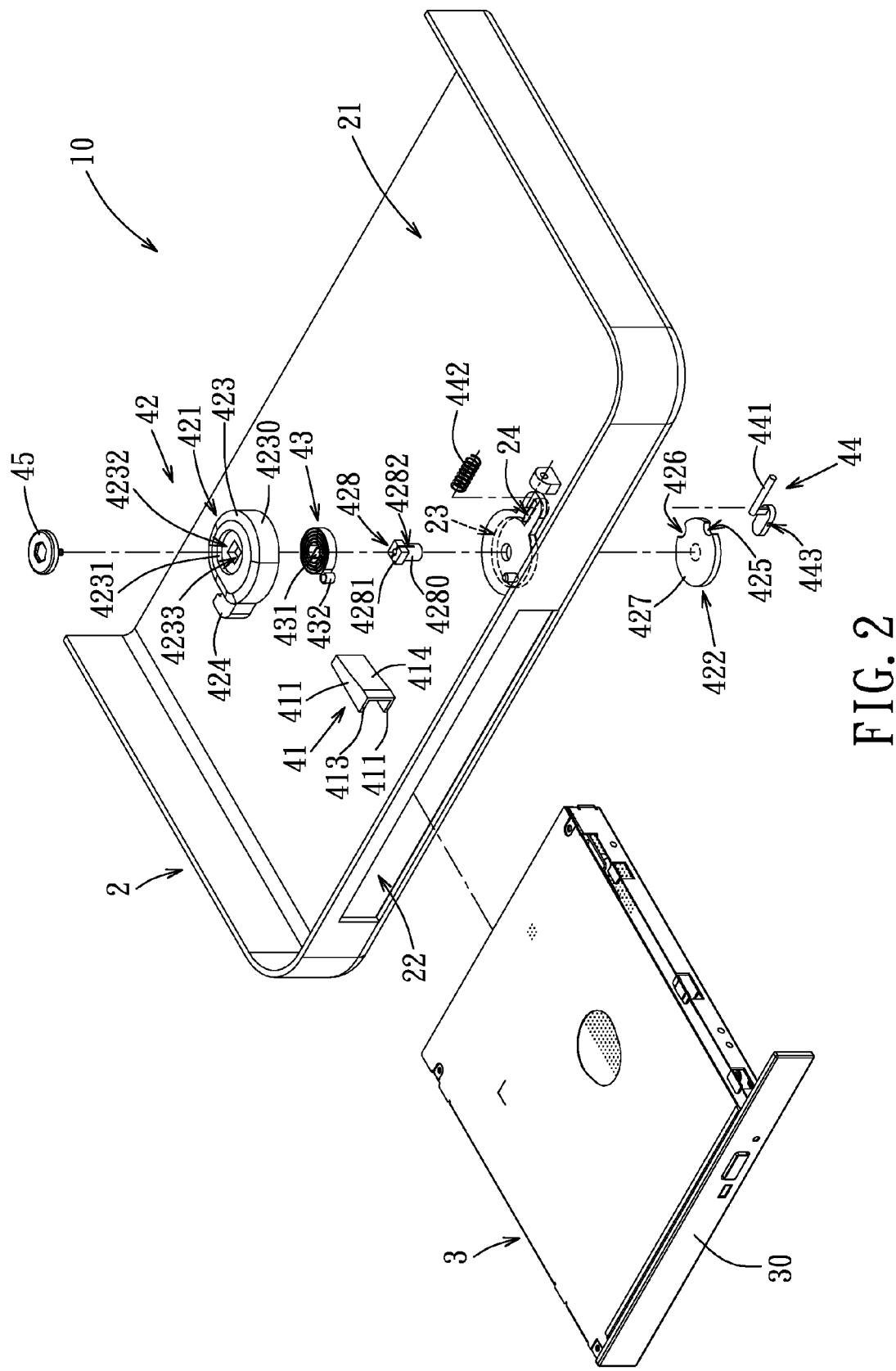
FIG. 2 is an exploded perspective view of this embodiment.

Referring to FIGS. 1 and 2, an embodiment of an electronic device 10 of the present invention comprises a housing 2, an object 3 and a fastening mechanism 4. The housing 2 is formed with an opening 22 and a through hole 23. In this embodiment, the object 3 is an optical disk drive, which is disposed within the housing 2 with a front panel 30 thereof covering the opening 22, and which is operable to be removed from the housing 2 through the opening 22.

The fastening mechanism 4 includes a nosepiece 41, a rotating unit 42, a torsion spring 43, and a locking unit 44. The nosepiece 41 is disposed at one side of the object 3, may have an elongated configuration as formed by bending a plate body, and includes two trapezoidal plate portions 411 spaced apart from each other in a top-to-bottom manner, and a side plate portion 414 connected to slanted edges of the two trapezoidal plate portions 411 and located at a distal side of the nosepiece 41 with respect to the object 3. The nosepiece 41 has an outer end 413 adjacent to the opening 22. Straight edges of the two trapezoidal plate portions 411 of the nosepiece 41 opposite to the slanted edges are in contact with the object 3, the outer end 413 faces the opening 22, and the side plate portion 414 extends from the outer end 413 in a direction away from the opening 22 and gradually approaching the object 3. This oblique configuration is designed to match the rotating unit 42, which will be understood from the following description.

The rotating unit 42 extends through the through hole 23, is rotatably connected to the housing 2, and includes a wheel body 421 disposed within the housing 2, and a rotating disc 422 coupled to the wheel body 421 and disposed outside the housing 2. The wheel body 421 includes a peripheral wall 423, and a stop block 424 protruding from the peripheral wall 423 and operable to abut against the outer end 413 of the nosepiece 41. The peripheral wall 423 has an outer peripheral friction surface 4230 disposed in frictional contact with an outer surface of the side plate portion 414. The rotating disc 422 includes a disc body 427 formed with a first positioning notch 425 and a second positioning notch 426, where the first positioning notch 425 and the second positioning notch 426 are apart from each other in a periphery of the disc body 427. The rotating disc 422 further includes a rotating shaft 428 fixed to the disc body 427.

The wheel body 421 further includes an end wall 4231 connected to one end of the peripheral wall 423. The end wall 4231 is formed with a circular recess 4232 and a noncircular engaging aperture 4233 in communication with the circular recess 4232. The outer peripheral friction surface 4230 of the peripheral wall 423 has an involute contour, and the outer surface of the side plate portion 414 of the nosepiece 41 is an oblique surface cooperating with the involute contour to maintain a tangential contact therebetween, so as to maintain frictional contact between the nosepiece 41 and the wheel body 421. The involute contour is an involute trace with the circular recess 4232 serving as the base circle thereof. However, the present invention is not limited to the involute contour. Alternatively, the outer peripheral friction surface 4230 of the peripheral wall 423 of the wheel body 421 may be a circumferential contour, and the outer surface of the side plate portion 414 of the nosepiece 41 may be a flat surface in tangential contact with the outer peripheral friction surface 4230, as long as the nosepiece 41 and the wheel body 421 can be maintained in frictional contact.

Figure 4:
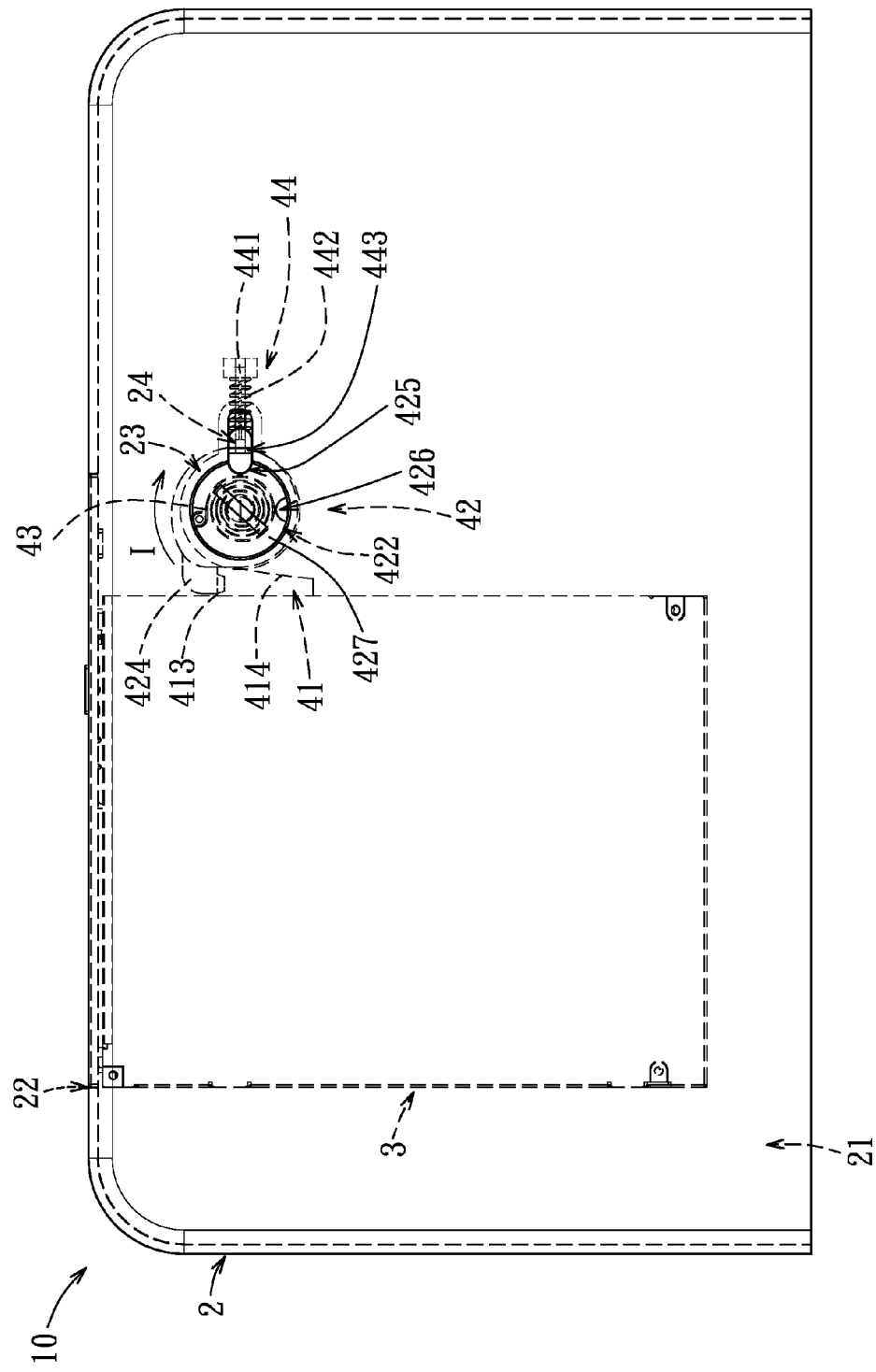
FIGS. 4 and 5 are schematic bottom views, illustrating the structure and operation of a rotating unit and a locking unit of the electronic device according to this embodiment.

The wheel body 421 and the rotating disc 422 are mounted to the housing 2 through the rotating shaft 428. The rotating shaft 428 has a cylindrical shaft body 4280 and a noncircular engaging block 4281 connected to the cylindrical shaft body 4280 and engaged to the engaging aperture 4233, and is formed with an elongated aperture 4282 extending longitudinally. The torsion spring 43 includes an inner end 431 engaged with the elongated aperture 4282 and an outer end 432 connected to the housing 2, and is able to store therein a biasing force to bias the rotating unit 42 to rotate in a releasing direction (I) (FIG. 4). The fastening mechanism 4 further includes a screw fastener 45 extending through the engaging aperture 4233 and screwed into the elongated aperture 4282.

Figure 3:
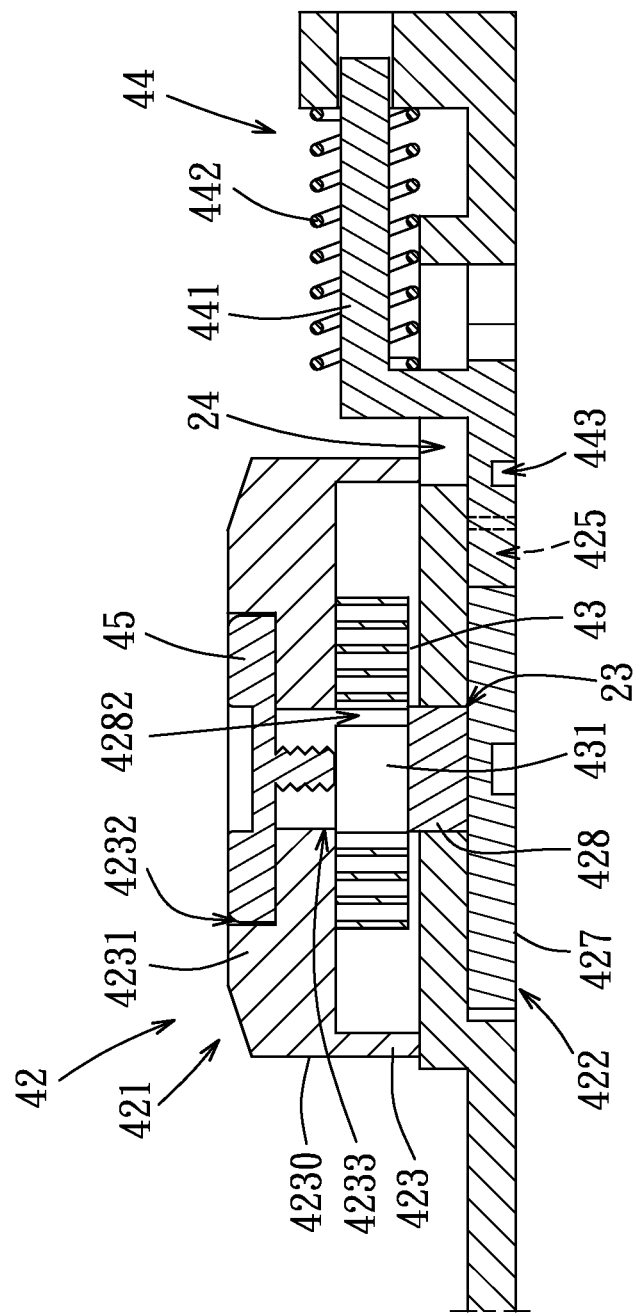
FIG. 3 is a sectional schematic view taken along line III-III of FIG. 1, illustrating a locking lever engaged with a first positioning notch according to this embodiment.

Referring to FIG. 3, in this embodiment, the housing 2 is formed with a sliding groove 24 in communication with the external environment. The locking unit 44 is mounted to the housing 2 and includes a locking lever 441 extending through the sliding groove 24 and releasably engaged with the first positioning notch 425, and a spring 442 disposed within the housing 2 and biasing the locking lever 441 toward the rotating disc 422. The locking lever 441 has a slot 443.

Figure 5:
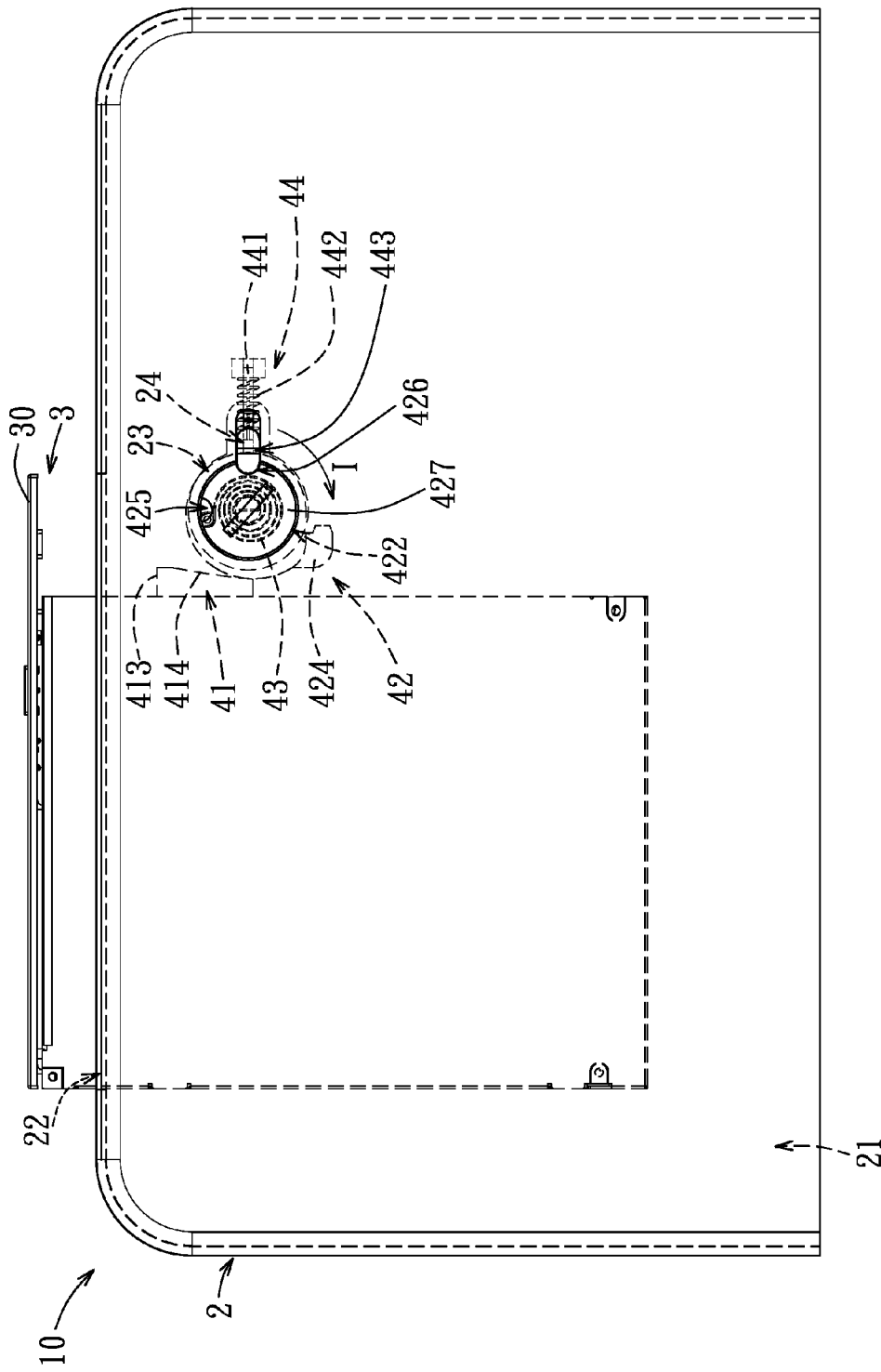
Figure 6:
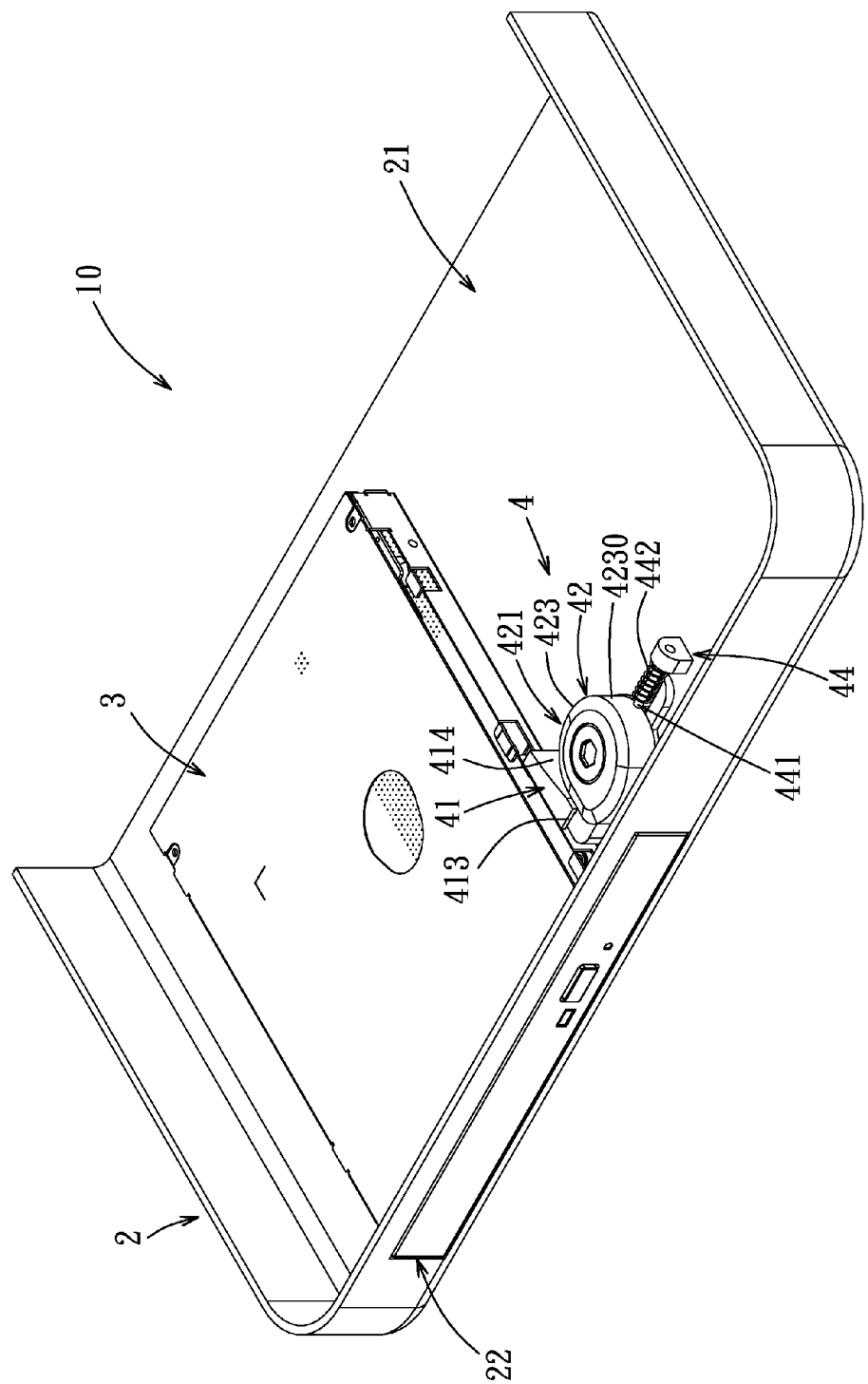
FIGS. 6 to 8 are schematic perspective views, illustrating installation and removal of an object according to this embodiment.
Figure 7:
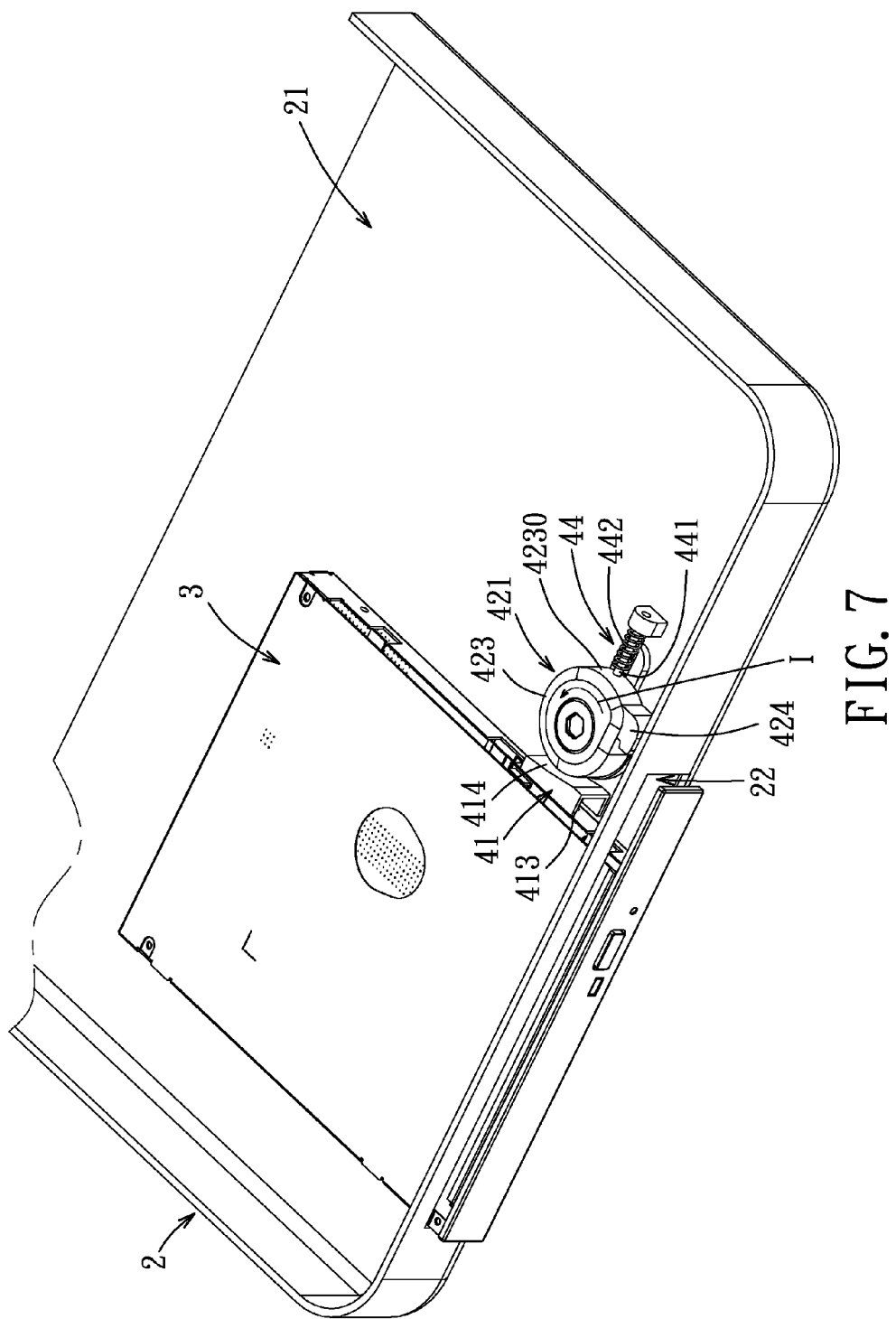
Figure 8:
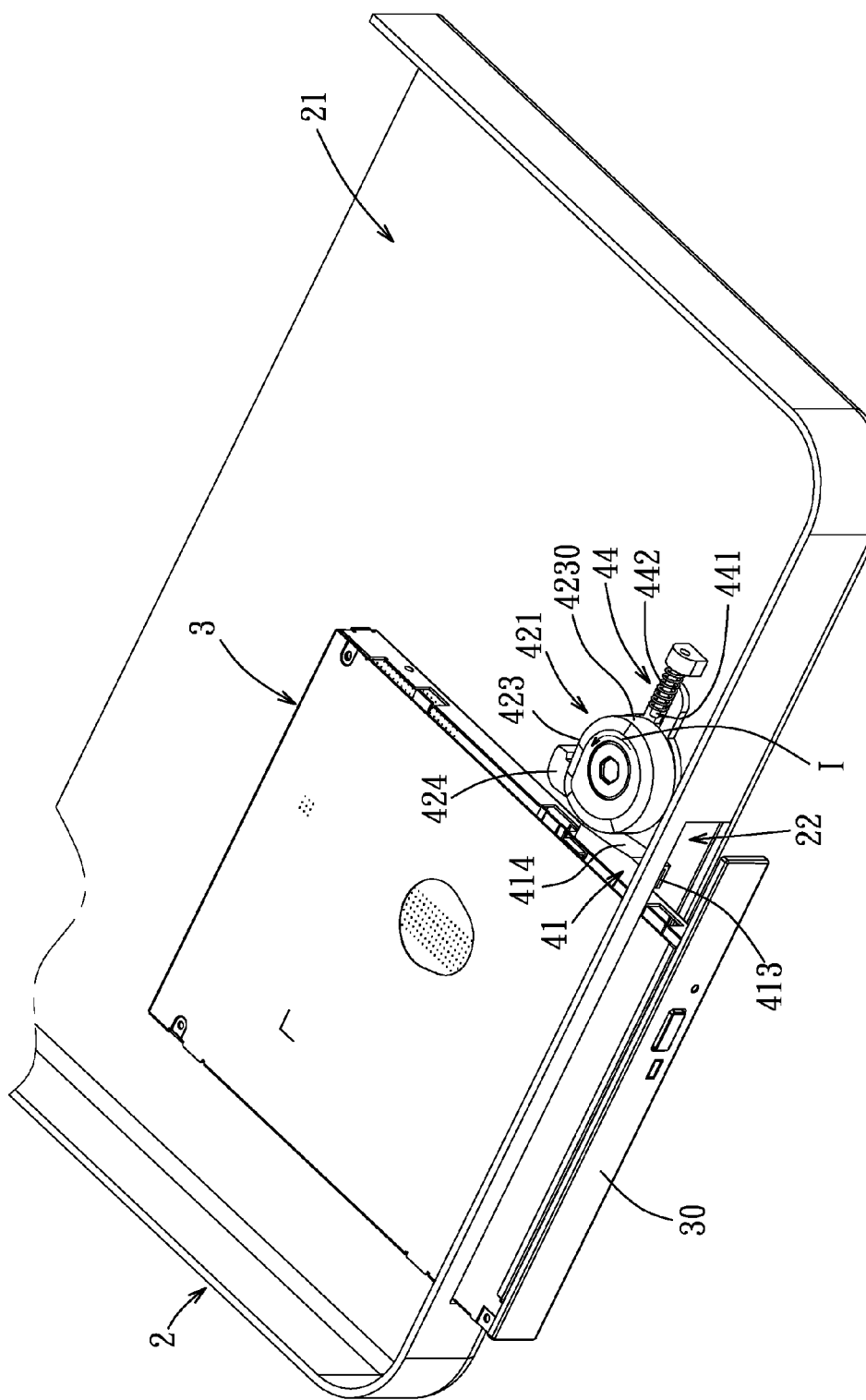

Referring to FIGS. 4 and 6, when the locking lever 441 of the locking unit 44 is engaged with the first positioning notch 425, the rotating unit 42 is disposed at a stopped position, where the stop block 424 of the rotating unit 42 abuts against the outer end 413 of the nosepiece 41. At this time, the object 3 is fastened to the housing 2. When it is intended to remove the object 3 from the housing 2, a user may engage a flat tool with the slot 443 in the locking lever 441, and then push the locking lever 441 away from the rotating disc 422 to disengage the locking lever 441 from the first positioning notch 425, to enable the spring 442 to accumulate a restoring force, and to allow the biasing force stored in the torsion spring 43 to bias the rotating unit 42 to rotate relative to the housing 2 in the releasing direction (I) (as shown in FIG. 7) to thereby drive the object 3 to partially move out of the housing 2 through the opening 22 (as shown in FIG. 8) by virtue of the frictional contact between the outer peripheral friction surface 4230 of the rotating unit 42 and the outer surface of the side plate portion 414 of the nosepiece 41. At this time, once the user releases her/his hand, the locking lever 441 is biased by the restoring force of the spring 442 to move toward the rotating disc 422 and engage with the second positioning notch 426 (as shown in FIG. 5), thereby releasing the object 3 from the housing 2.

It should be noted that, at least one of the nosepiece 41 and the wheel body 421 may be made of a soft material to enhance the frictional force between the wheel body 421 and the nosepiece 41, and to ensure that the frictional force is sufficient to drive the object 3 to partially move out of the housing 2.

Referring to FIGS. 5 and 8, when the locking lever 441 of the locking unit 44 is engaged with the second positioning notch 426, the rotating unit 42 is disposed at a released position, where the stop block 424 of the rotating unit 42 is distal from the outer end 413 of the nosepiece 41. When it is intended to insert the object 3 into the housing 2, the user needs to engage the flat tool with the slot 443 in the locking lever 441, and then, after pushing the locking lever 441 away from the rotating disc 422 to disengage the locking lever 441 from the second positioning notch 426 and to enable the spring 442 to accumulate a restoring force, push the object 3 into the housing 2. At this time, by virtue of frictional contact between the outer surface of the side plate portion 414 of the nosepiece 41 and the peripheral wall 423 of the wheel body 421, the rotating unit 42 is driven to rotate in a direction opposite to the releasing direction (I) shown in FIG. 7, to thereby enable the torsion spring 43 to store the biasing force therein for biasing the rotating unit 42 in the releasing direction (I). Once the stop block 424 of the rotating unit 42 abuts against the outer end 413 of the nosepiece 41, the rotating unit 42 is disposed in the stopped position, and the object 3 would have completely moved into the housing 2. By disengaging the flat tool from the slot 443, the locking lever 441 is biased by the restoring force of the spring 442 to move toward the rotating disc 422 and engage the first positioning notch 425 (as shown in FIG. 4), so that the object 3 is maintained within the housing 2 (as shown in FIG. 6), thereby completing installation of the object 3 to the housing 2.

It should be noted that, during rotation of the wheel body 421 of the rotating unit 42, the outer surface of the side plate portion 414 of the nosepiece 41 cooperates with the involute contour of the outer peripheral friction surface 4230 of the wheel body 421 to constantly maintain a tangential contact therebetween, and in this way, the action force of the rotation is always applied perpendicularly to the outer surface of the side plate portion 414, so that a constant frictional force is maintained, thereby achieving smooth movement of the object 3 out of or into the housing 2 through the opening 22.

To sum up, according to the present invention, the mere action of pushing the locking lever 441 enables the user to remove or install the object 3 from or into the electronic device 10 with ease due to the frictional force between the rotating unit 42 and the nosepiece 41. In addition, since the involute contour of the outer peripheral friction surface 4230 of the wheel body 421 of the rotating unit 42 is always maintained in tangential contact with the outer surface of the side plate portion 414 of the nosepiece 41, during rotation of the wheel body 421, the action force applied to the nosepiece 41 is always perpendicular to the outer surface of the side plate portion 414, so that the frictional force remains constant, thereby enabling the object 3 to move relative to the housing 2 more smoothly. Thus, the objects of the present invention can surely be achieved.

While the present invention has been described in connection with what are considered the most practical embodiment, it is understood that this invention is not limited to the disclosed embodiment but is intended to cover various arrangements included within the spirit and scope of the broadest interpretation so as to encompass all such modifications and equivalent arrangements.

What is claimed is:

1. An electronic device, comprising:
    a housing formed with an opening and a through hole;
    an object removably disposed in said housing and covering said opening, said object being operable to be removed from said housing through said opening; and
    a fastening mechanism including
        a nosepiece disposed at one side of said object and located in said housing, said nosepiece including an outer end that faces said opening, and a side surface that extends from said outer end in a direction away from said opening,
        a rotating unit extending through said through hole and rotatably coupled to said housing, said rotating unit including a wheel body that is disposed in said housing, and a rotating disc that is coupled to said wheel body and that is disposed outside said housing, said wheel body including a peripheral wall and a stop block that protrudes from said peripheral wall and that is operable to abut against said outer end of said nosepiece, said peripheral wall having an outer peripheral friction surface that is disposed in frictional contact with said side surface of said nosepiece, said rotating disc being formed with a first positioning notch, said rotating unit being operable to rotate in a releasing direction relative to said housing to bring said stop block to move away from said outer end and to move said object away from said housing through said opening by virtue of the frictional contact between said outer peripheral friction surface and said side surface of said nosepiece,
        a torsion spring disposed in said housing and operable to bias said rotating unit in the releasing direction, and
        a locking unit mounted to said housing and releasably engaging said first positioning notch;
    wherein said rotating unit is disposed at a stopped position, where said stop block abuts against said outer end of said nosepiece and said object is positioned in said housing, when said locking unit is engaged with said first positioning notch.

2. The electronic device of claim 1, wherein at least one of said nosepiece and said wheel body is made of a soft material.

3. The electronic device of claim 2, wherein said outer peripheral friction surface is an involute contour, and said side surface is an oblique surface in tangential contact with said involute contour.

4. The electronic device of claim 3, wherein said wheel body further includes an end wall connected to one end of said peripheral wall, said end wall being formed with a circular recess, said involute contour being an involute trace with said circular recess serving as a base circle thereof.

5. The electronic device of claim 4, wherein said housing is further formed with a sliding groove in communication with the external environment, said locking unit including a locking lever that extends through said sliding groove and that is releasably engaged with said first positioning notch, and a spring that is disposed within said housing and that biases said locking lever toward said rotating disc, said rotating unit being disposed at the released position when said locking lever is engaged with said first positioning notch.

6. The electronic device of claim 5, wherein said rotating disc is further formed with a second positioning notch spaced at an angle from said first positioning notch, said locking lever being releasably engaged with said second positioning notch, said rotating unit being disposed at a released position, where said stop block is distal from said outer end and said object is partially removed from said housing, when said locking lever is engaged with said second positioning notch.

7. The electronic device of claim 6, wherein said rotating disc includes a disc body and a rotating shaft fixed to said disc body, said disc body being formed with said first positioning notch and said second positioning notch, said end wall of said wheel body being further formed with a noncircular engaging aperture in communication with said circular recess, said rotating shaft having a noncircular engaging block engaged with said engaging aperture for coupling said rotating disc to said wheel body.

8. The electronic device of claim 7, wherein said rotating shaft is formed with an elongated aperture extending longitudinally, said torsion spring including an inner end that is engaged with said elongated aperture and an outer end that is connected to said housing, said fastening mechanism further including a screw fastener extending through said engaging aperture and screwed into said elongated aperture.

9. The electronic device of claim 6, wherein said locking lever has a slot to be inserted by a tool for moving said locking lever away from said rotating disc against biasing force of said spring.

10. A fastening mechanism for fastening an object to a housing of an electronic device, comprising:
a nosepiece to be disposed at one side of the object and to be located in the housing, said nosepiece including an outer end to face an opening in the housing, and a side surface to be disposed so as to extend from said outer end in a direction away from the opening;
a rotating unit to extend through a through hole in the housing and to be rotatably coupled to the housing, said rotating unit including a wheel body to be disposed in the housing, and a rotating disc coupled to said wheel body and to be located outside the housing, said wheel body including a peripheral wall and a stop block that protrudes from said peripheral wall and that is operable to abut against said outer end of said nosepiece, said peripheral wall having an outer peripheral friction surface that is disposed in frictional contact with said side surface of said nosepiece, said rotating disc being formed with a first positioning notch, said rotating unit being operable to rotate in a releasing direction relative to the housing to bring said stop block to move away from said outer end and to move the object away from the housing through the opening by virtue of the frictional contact between said outer peripheral friction surface and said side surface of said nosepiece;
a torsion spring to be disposed in the housing and operable to bias said rotating unit in the releasing direction; and
a locking unit to be disposed in the housing and releasably engaging in said first positioning notch;
wherein said rotating unit is disposed at a stopped position, where said stop block abuts against said outer end of said nosepiece to position the object in the housing when said locking unit is engaged with said first positioning notch.

11. The fastening mechanism of claim 10, wherein at least one of said nosepiece and said wheel body is made of a soft material.

12. The fastening mechanism of claim 11, wherein said outer peripheral friction surface is an involute contour, and said side surface is an oblique surface in tangential contact with said involute contour.

13. The fastening mechanism of claim 12, wherein said wheel body further includes an end wall connected to one end of said peripheral wall, said end wall being formed with a circular recess, said involute contour being an involute trace with said circular recess serving as a base circle thereof.

14. The fastening mechanism of claim 13, the housing being further formed with a sliding groove in communication with the external environment, wherein said locking unit includes a locking lever to be extended through the sliding groove and releasably engaged with said first positioning notch, and a spring to be disposed in the housing and biasing said locking lever toward said rotating disc, said rotating unit being disposed at the released position when said locking lever is engaged with said first positioning notch.

15. The fastening mechanism of claim 14, wherein said rotating disc is further formed with a second positioning notch spaced at an angle from said first positioning notch, said locking lever being releasably engaged with said second positioning notch,
said rotating unit being disposed at a released position, where said stop block is distal from said outer end and said object is partially removed from said housing, when said locking lever is engaged with said second positioning notch.

16. The fastening mechanism of claim 15, wherein said rotating disc includes a disc body and a rotating shaft fixed to said disc body, said disc body being formed with said first positioning notch and said second positioning notch, said end wall of aid wheel body being further formed with a noncircular engaging aperture in communication with said circular recess, said rotating shaft having a noncircular engaging block engaged with said engaging aperture for coupling said rotating disc to said wheel body.

17. The fastening mechanism of claim 16, wherein said rotating shaft is formed with an elongated aperture extending longitudinally, said torsion spring including an inner end that is engaged with said elongated aperture and an outer end that is connected to said housing, said fastening mechanism further including a screw fastener extending through said engaging aperture and screwed into said elongated aperture.

18. The fastening mechanism of claim 15, wherein said locking lever has a slot to be inserted by a tool for moving said locking lever away from said rotating disc against biasing force of said spring.

* * * * *